United States Patent Office 2,956,991
Patented Oct. 18, 1960

2,956,991

THREE-COMPONENT ALKYL ALUMINUM HALIDE CATALYSTS FOR OLEFIN POLYMERIZATION AND OLEFIN POLYMERIZATION PROCESS THEREWITH

Harry W. Coover, Jr., and Frederick B. Joyner, Kingsport, Tenn., assignors to Eastman Kodak Company, Rochester, N.Y., a corporation of New Jersey No Drawing. Filed Mar. 31, 1958, Ser. No. 724,910

14 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins using a particular catalyst combination which has unexpected catalytic activity and which gives products characterized by unusually high crystallinity, softening point, thermal stability, stiffness and being substantially free of non-crystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Certain of the trialkyl aluminum compounds have been used in conjunction with inorganic halides to give high molecular weight polyethylene. Thus, triethyl aluminum in conjunction with titanium tetrachloride permits a low temperature, low pressure polymerization of ethylene to highly crystalline product. When this catalyst mixture is employed to polymerize propylene, the product is predominantly polymeric oils and rubbers with a comparatively small amount of high molecular weight crystalline product. Furthermore, a mixture of ethyl aluminum sesquihalide and titanium trihalide is ineffective as a polymerization catalyst, for example, for polymerizing propylene.

Some of the catalysts that are effective for producing crystalline high density polyethylene cannot be used to produce a similar type of polypropylene. Thus, one cannot predict whether a specific catalyst combination will be effective to produce crystalline high density polymers with specific α-olefins.

This invention concerned with and has for an object the provision of improved processes whereby α-monoolefins and particularly propylene can be readily polymerized by catalytic means to give high molecular weight, highly crystalline polymers. A particular object of the invention is to provide a catalyst combination which has unexpected catalytic activity for the polymerization of α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing an aluminum sesquihalide having the formula $R_3Al_2X_3$ wherein R is a hydrocarbon radical containing 1–12 carbon atoms and selected from the group consisting of alkyl, aryl and aralkyl and X is a halide selected from the group consisting of chlorine, bromine and iodine, a compound of a transition metal selected from the group consisting of titanium, zirconium, vanadium, chromium and molybdenum, said compound being selected from the group consisting of halide, alkoxides, alkoxyhalides and acetylacetonates, and a third component selected from the compounds having the formulas:

$P(O)Y_3$, $PY_3$, $RC(O)Y$, and $YC(O)(CH_2)_nC(O)Y$ wherein each Y is an alkylamino (—$NR_2$) or alkoxy (—OR), said R being an alkyl radical containing 1 to 4 carbon atoms, and wherein $n$ is an integer of 1 to 8, preferably 1 to 4. The catalytic activity of this mixture was wholly unexpected, particularly since the alkyl aluminum sesquihalides and transition element compounds have not been known to possess catalystic activity for the polymerization of propylene and higher olefins to crystalline polymers and the third component is not a known polymerization catalyst. The inventive process is carried out in liquid phase in an inert organic liquid and preferably an inert liquid hydrocarbon vehicle. The process proceeds with excellent results over a temperature range of from 0° C. to 250° C. although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves both as a liquid reaction medium and as a solvent for the solid polymerization products at the temperature of polymerization.

The invention is of particular importance in the preparation of highly crystalline polyethylene, polypropylene, the polybutenes and polystyrene although it can be used for polymerizing mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures, but they are soluble in such solvents as xylene, toluene or tetralin at temperatures about 100° C. These solubility characteristics make it possible to carry out the polymerization process under conditions wherein the polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosity as measured in tetralin at 145° C. can be varied from about 0.5 or lower to 5.0 or higher. Melt indices as measured by the standard ASTM method may be varied from about 0.1 to 100 or even higer.

The novel catalysts described above are particularly useful for polymerizing propylene to form a crystalline, high-density polymer. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spung from the molten polyolefins obtained according to this process.

As has been indicated above the improved results obtained in accordance with this invention depend upon the particular catalyst combination. Thus, one of the components of the catalyst is a compound of aluminum sesquihalide having formula $R_3Al_2X_3$ wherein R is a hydrocarbon radical containing 1–12 carbon atoms and selected from the group consisting of alkyl, aryl and aralkyl. Among these hydrocarbon radicals are methyl, ethyl, propyl, butyl, phenyl, phenylethyl, naphthyl and the like, and the halogen selected from the group consisting of chlorine, bromine and iodine. The preferred aluminum sesquihalides are the lower alkyl aluminum sesquihalides and the most preferred compound is ethyl aluminum sesquihalide. Another component of the catalyst composition is a compound of a transition metal selected from the group consisting of titanium, zirconium, vanadium, chromium and molybdenum. In these compounds the transition metal can be at its maximum valence but it is possible to employ a compound of a transition metal having a reduced valence. Among the transition metal compounds that can be used are the halides, alkoxides, alkoxyhalides and acetyl-acetonates of the above-named transition metals. Such compounds as titanium tetrachloride, titanium trichloride, titanium dichloride, titanium ethoxide, titanium butoxide, dibutoxy titanium dichloride, diethoxy titanium dichloride and titanium acetylacetonate can be used in the catalyst combination. Similar compounds of zirconium, vanadium, chromium and molybdenum can also be used. For the most desirable results it is preferred to use a halide of titanium having either its maximum valency or a reduced valency and specifically it is preferred to employ either titanium tetrachloride or titanium trichloride in the catalyst composition. The third component of the catalyst composition is a compound having the formula:

$$P(O)Y_3, PY_3, RC(O)Y \text{ and } YC(O)(CH_2)_nC(O)Y$$

Each Y represents a lower alkylamino or lower alkoxy radical, R is a lower alkyl radical containing 1 to 8, preferably 1 to 4 carbon atoms and $n$ is an integer of 1 to 4.

Among the specific compounds that can be used are tris-N,N-dimethyl phosphoramide, triethyl phosphate, mixed phosphate ester-amides, triethyl phosphite, N,N-dimethylacetamide, adipamide and the like.

The limiting factor in the temperature of the process appears to be the decomposition temperature of the catalyst. Ordinarily temperatures from 50° C. to 150° C. are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5–10% by weight in a solution are ordinarily less desirable because the polymer dissolved in the reaction medium results in a very viscous solution.

The preferred molar ratio of aluminum compound to transition metal compound can be varied within the range of 1:0.5 to 1:2, and the molar ratio of aluminum compound to the third component of the catalytic mixture can be varied within the range of 1:1 to 1:0.25, but it will be understood that higher and lower molar ratios are within the scope of this invention. A particularly effective catalyst contains one mole of transition metal compound and 0.5 mole of the third component per mole of aluminum compound. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, Decalin, and any of the other well-known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing ethylene, propylene, styrene and other α-monoolefins in accordance with this invention is a mixture of ethyl aluminum sesquibromide, titanium trichloride and tris-N,N-dimethyl phosphoramide. The importance of the various components of this reaction mixture is evident from the fact that a mixture of ethyl aluminum sesquibromide and titanium trichloride is ineffective for polymerizing propylene. However, when the above phosphoramide or other third component within the scope of this invention is added to the mixture the resulting catalyst composition is highly effective for polymerizing propylene to form a highly crystalline high-density polymer.

The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with a polymerizable α-monoolefin.

Similarly, a catalyst mixture containing ethyl aluminum sesquibromide and titanium tetrachloride can be used to polymerize propylene but the polymer formed contains mainly dimers, trimers and tetramers of propylene. When the polymerization is carried out using a similar catalyst to which the above phosphoramide or other third compound within the scope of this invention has been added the product is a highly crystalline polymer of high density and high softening point.

The invention is illustrated by the following examples of certain preferred embodiments thereof.

Example 1

In a nitrogen-filled dry box 2 grams of catalyst was added to a 500 ml. pressure bottle containing 100 ml. of dry heptane. The catalyst was made up of ethyl alumi- num sesquibromide and titanium trichloride in a molar ratio of 1:1. The pressure bottle was then attached to a propylene source and the reaction mixture was agitated at 70° C. and under 30 p.s.i. of propylene pressure for 6 hours. No solid polypropylene was formed and little, if any, liquid polymer was formed during this time indicating that under these conditions the catalyst mixture was ineffective for polymerizing propylene to form a solid crystalline product.

Example 2

The procedure described in Example 1 was followed using 2 grams of a catalyst made up of phenyl aluminum sesquibromide, titanium trichloride and tris-N,N-dimethyl phosphoramide, $P(O)[N(CH_3)_2]_3$ in a molar ratio of 1:1:0.5. During the 6-hour period of agitation of the reaction mixture at 70° C. under 30 p.s.i. propylene pressure, there was formed 12.9 grams of highly crystalline polypropylene having a density of 0.921 and an inherent viscosity of 3.44 in tetralin at 145° C. The polymer was readily molded into a hard, clear button having a softening point of 161–165° C.

When the phenyl aluminum sesquibromide in the above catalyst formulation was replaced by ethyl aluminum sesquichloride, an equally efficient catalyst was formed, and under similar conditions the use of this catalyst resulted in the production of 15.1 grams of highly crystalline polypropylene. Also, replacement of the titanium trichloride with vanadium trichloride resulted in an equally efficient catalyst composition for polymerizing propylene.

Example 3

In a nitrogen-filled dry box a 500 ml. pressure bottle was loaded with 100 ml. of dry heptane and 2 grams of a catalyst made up of benzyl aluminum sesquibromide and titanium tetrachloride in a 1:1 molar ratio. The pressure bottle was then attached to a propylene source and the reaction mixture was agitated at 70° C. and under 30 p.s.i. of propylene pressure for 6 hours. No solid propylene polymer was obtained. However, 60 grams of liquid, low-molecular weight polymers were formed. Analysis by gas chromatography indicated that this product contained propylene dimers, trimers and tetramers.

Example 4

The process of Example 3 was followed using a 2-gram catalyst charge containing ethyl aluminum sesquibromide, titanium tetrachloride and tris-N,N-dimethyl phosphoramide in a molar ratio of 1:1:1. A 16.7 gram yield of solid polypropylene was produced. This solid polymer was extracted with dibutyl ether to remove a small quantity of rubbery polypropylene and then extracted with heptane to remove low molecular weight, crystalline polypropylene. The residual 13.4 grams of polypropylene was highly crystalline; density 0.918, inherent viscosity 2.62 and softening point 162–166° C.

Vanadium tetrachloride, zirconium tetrachloride, molybdenum pentachloride and chromic chloride, when used in place of titanium tetrachloride in the above catalyst, results in catalysts that effectively polymerize propylene to solid crystalline polymers.

Example 5

Inside a nitrogen-filled dry box a 280 ml. stainless steel autoclave was loaded with 0.75 grams of a catalyst having a 1:1:0.25 molar ratio of dodecyl aluminum sesquichloride, titanium trichloride and tris-N,N-dimethyl phosphoramide. The autoclave was sealed, placed in a rocker and 100 ml. (51 grams) of propylene was added. Rocking was initiated and the mixture was heated to 85° C. for 4 hours. A yield of 47.3 grams of highly crystalline polypropylene was obtained having a density of 0.92 and an inherent viscosity of 3.84.

Mixed amide esters such as $C_2H_5OP(O)(NR_2)_2$, triethyl phosphate, triethyl phosphite, N,N-dimethylacetamide and adipamide, when used in place of the above phosphoramide produce desirable yields of highly crystalline polypropylene.

Example 6

The process of Example 5 was followed using 0.1 gram of catalyst charge containing a 1:2:0.25 molar ratio of ethyl aluminum sesquichloride, titanium trichloride and tris-N,N-dimethyl phosphoramide at 85° C. to produce 9.5 grams of highly crystalline polypropylene having a density of 0.919 and an inherent viscosity of 1.48.

Example 7

The process of Example 5 was followed using 1.5 grams of catalyst charge containing ethyl aluminum sesquichloride, titanium trichloride and tris-N,N-dimethyl phosphoramide in a molar ratio of 1:0.5:0.25 and at a temperature of 55° C. A highly crystalline polypropylene was formed.

Example 8

The process of Example 5 was followed using 3-methyl-1-butene as the monomer at a polymerization temperature of 150° C. A 28-gram yield of highly crystalline poly-3-methyl-1-butene was obtained. Good yields of highly crystalline polymer were also obtained using 4-methyl-1-pentene, 1 - butene, 1 - pentene and vinylcyclohexane, styrene and fluorostyrene as monomers.

Thus, by means of this invention polyolefins such as polyethylene and polypropylene are readily produced using a catalyst combination which, based on the knowledge of the art, would not be expected to be effective. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

We claim:

1. In the polymerization of propylene to form solid crystalline polymer the improvement which comprises effecting the polymerization in liquid dispersion in an inert liquid hydrocarbon vehicle and in the presence of a catalytic mixture consisting essentially of a molar ratio of ethyl aluminum sesquibromide and titanium tetrachloride of 1:0.5 to 1:2 and a molar ratio of ethyl aluminum sesquibromide and tris-N,N-dimethyl phosphoramide within the range of 1:1 to 1:0.25.

2. As a composition of matter, a polymerization catalyst consisting essentially of a molar ratio of ethyl aluminum sesquibromide and titanium trichloride of 1:0.5 to 1:2 and a molar ratio of ethyl aluminum sesquibromide and tris-N,N-dimethyl phosphoramide within the range of 1:1 to 1:0.25.

3. As a composition of matter, a polymerization catalyst consisting essentially of a molar ratio of ethyl aluminum sesquichloride and titanium tetrachloride within the range of 1:0.5 to 1:2 and a molar ratio of ethyl aluminum sesquichloride to tris-N,N-dimethyl phosphoramide within the range of 1:1 to 1:0.25.

4. As a composition of matter, a polymerization catalyst consisting essentially of a molar ratio of ethyl aluminum sesquibromide and titanium tetrachloride of 1:0.5 to 1:2 and a molar ratio of ethyl aluminum sesquibromide and tris-N,N-dimethyl phosphoramide within the range of 1:1 to 1:0.25.

5. In the polymerization of α-monoolefinic hydrocarbons containing 3 to 8 carbon atoms to form solid crystalline polymer, the improvement which comprises catalyzing the polymerization with a catalytic mixture consisting essentially of an aluminum sesquihalide having the formula $R_3Al_2X_3$ wherein R is a hydrocarbon radical selected from the group consisting of alkyl radicals containing 1 to 12 carbon atoms, phenyl and benzyl, and X is a halogen atom selected from the group consisting of chlorine, bromine and iodine, a chloride of a transition metal selected from the group consisting of titanium, zirconium, vanadium, chromium and molybdenum and an organophosphorus compound selected from the group consisting of tri-lower alkyl phosphites, tri-lower alkyl phosphates and hexa-lower alkyl phosphoric triamides, the molar ratio of aluminum sesquihalide to organophosphorus compound being within the range of 1:1 to 1:0.25.

6. In the polymerization of propylene to form solid crystalline polymer, the improvement which comprises effecting the polymerization in liquid dispersion in an inert hydrocarbon liquid and in the presence of a catalytic mixture consisting essentially of an alkyl aluminum sesquihalide wherein the alkyl radicals contain 1 to 12 carbon atoms and the halogen atoms are selected from the group consisting of chlorine, bromine and iodine, a titanium chloride and an organophosphorus compound selected from the group consisting of tri-lower alkyl phosphites, tri-lower alkyl phosphates and hexa-lower alkyl phosphoric triamides, the molar ratio of aluminum sesquihalide to organophosphorus compound being within the range of 1:1 to 1:0.25.

7. In the polymerization of propylene to form solid crystalline polymer, the improvement which comprises effecting the polymerization in liquid dispersion in an inert hydrocarbon liquid and in the presence of a catalytic mixture consisting essentially of ethyl aluminum sesquibromide, titanium trichloride and tris-N,N-dimethyl phosphoramide, the molar ratio of ethyl aluminum sesquibromide and tris-N,N-dimethylphosphoramide being within the range of 1:1 to 1:0.25.

8. In the polymerization of propylene to form solid crystalline polymer, the improvement which comprises effecting the polymerization in liquid dispersion in an inert hydrocarbon liquid and in the presence of a catalytic mixture consisting essentially of ethyl aluminum sesquichloride, titanium tetrachloride and tris-N,N-dimethyl phosphoramide, the molar ratio of ethyl aluminum sesquichloride and tris-N,N-dimethylphosphoramide being within the range of 1:1 to 1:0.25.

9. In the polymerization of propylene to form solid crystalline polymer, the improvement which comprises effecting the polymerization in liquid dispersion in an inert hydrocarbon liquid and in the presence of a catalytic mixture consisting essentially of ethyl aluminum sesquichloride, titanium trichloride and tris-N,N-dimethyl phosphoramide, the molar ratio of ethyl aluminum sesquichloride and tris-N,N-dimethylphosphoramide being within the range of 1:1 to 1:0.25.

10. In the polymerization of propylene to form solid crystalline polymer, the improvement which comprises effecting the polymerization in liquid dispersion in an inert hydrocarbon liquid and in the presence of a catalytic mixture consisting essentially of ethyl aluminum sesquichloride, titanium trichloride and triethyl phosphate, the molar ratio of ethyl aluminum sesquichloride and triethyl phosphate being within the range of 1:1 to 1:0.25.

11. As a composition of matter, a polymerization catalyst consisting essentially of an aluminum sesquihalide having the formula $R_3Al_2X_3$ wherein R is a hydrocarbon radical selected from the group consisting of alkyl radicals containing 1 to 12 carbon atoms, phenyl and benzyl and X is a halogen atom selected from the group consisting of chlorine, bromine and iodine, a chloride of a transition metal selected from the group consisting of titanium, zirconium, chromium and molybdenum and an organophosphorus compound selected from the group consisting of tri-lower alkyl phosphites, tri-lower alkyl phosphates and hexa-lower alkyl phosphoric triamides, the molar ratio of aluminum sesquihalide to organophosphorus compound being within the range of 1:1 to 1:0.25.

12. As a composition of matter, a polymerization catalyst consisting essentially of an alkyl aluminum sesquihalide wherein the alkyl radicals contain 1 to 12 carbon atoms and the halogen atoms are selected from the group consisting of chlorine, bromine and iodine, a titanium chloride and an organophosphorus compound selected from the group consisting of tri-lower alkyl phosphites, tri-lower alkyl phosphates and hexa-lower alkyl phosphoric triamides, the molar ratio of aluminum sesquihalide to organophosphorous compound being within the range of 1:1 to 1:0.25.

13. As a composition of matter, a polymerization catalyst consisting essentially of ethyl aluminum sesquichloride, titanium trichloride and tris-N,N-dimethyl phosphoramide, the molar ratio of ethyl aluminum sesquichloride and tris-N,N-dimethylphosphoramide being within the range of 1:1 to 1:0.25.

14. As a composition of matter, a polymerization catalyst consisting essentially of ethyl aluminum sesquichloride, titanium trichloride and triethyl phosphate, the molar ratio of ethyl aluminum sesquichloride and triethyl phosphate being within the range of 1:1 to 1:0.25.

References Cited in the file of this patent

UNITED STATES PATENTS

| | | |
|---|---|---|
| 2,832,759 | Nowlin et al. | Apr. 29, 1958 |
| 2,839,474 | Johnson et al. | June 17, 1958 |
| 2,840,617 | Shokal | June 24, 1958 |
| 2,846,427 | Findlay | Aug. 5, 1958 |
| 2,862,917 | Anderson et al. | Dec. 2, 1958 |
| 2,874,153 | Bowman | Feb. 17, 1959 |

FOREIGN PATENTS

| | | |
|---|---|---|
| 534,792 | Belgium | Jan. 31, 1955 |
| 1,147,868 | France | June 11, 1957 |

UNITED STATES PATENT OFFICE
CERTIFICATE OF CORRECTION

Patent No. 2,956,991                                           October 18, 1960

Harry W. Coover, Jr., et al.

It is hereby certified that error appears in the printed specification of the above numbered patent requiring correction and that the said Letters Patent should read as corrected below.

Column 1, line 63, after "invention" insert -- is --; column 2, line 25, for "catalystic" read -- catalytic --; line 62, for "about" read -- above --.

Signed and sealed this 25th day of April 1961.

(SEAL)
Attest:
ERNEST W. SWIDER                                                DAVID L. LADD

Attesting Officer                                                      Commissioner of Patents